Feb. 7, 1961 C. E. HASTINGS 2,971,189
RADIO SYSTEM
Filed March 22, 1957 4 Sheets-Sheet 1
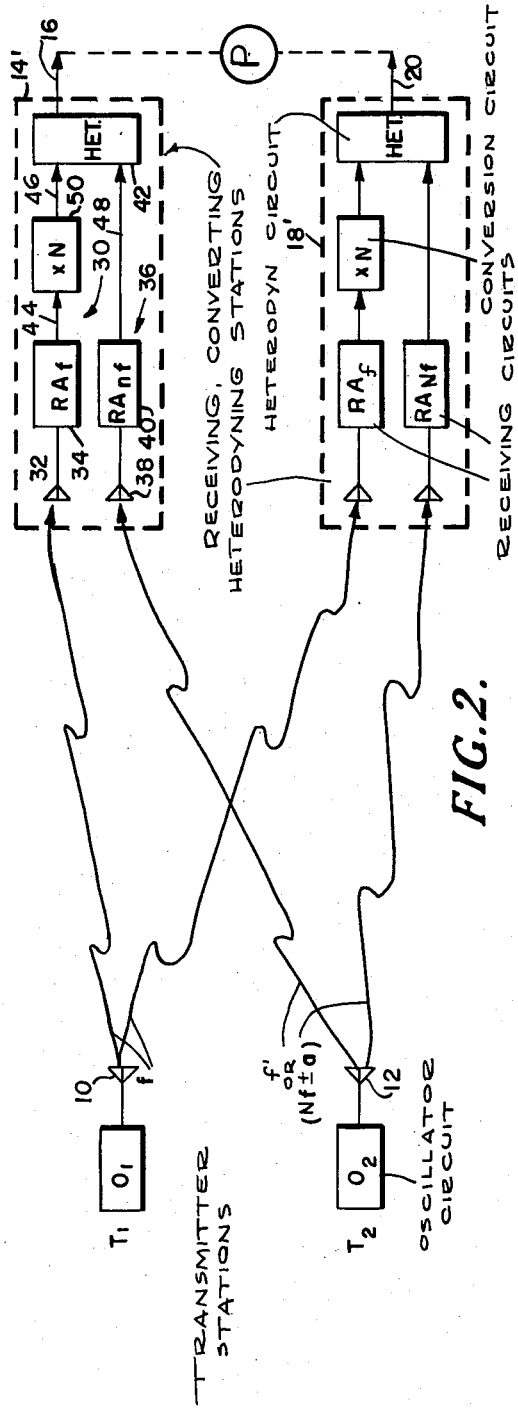
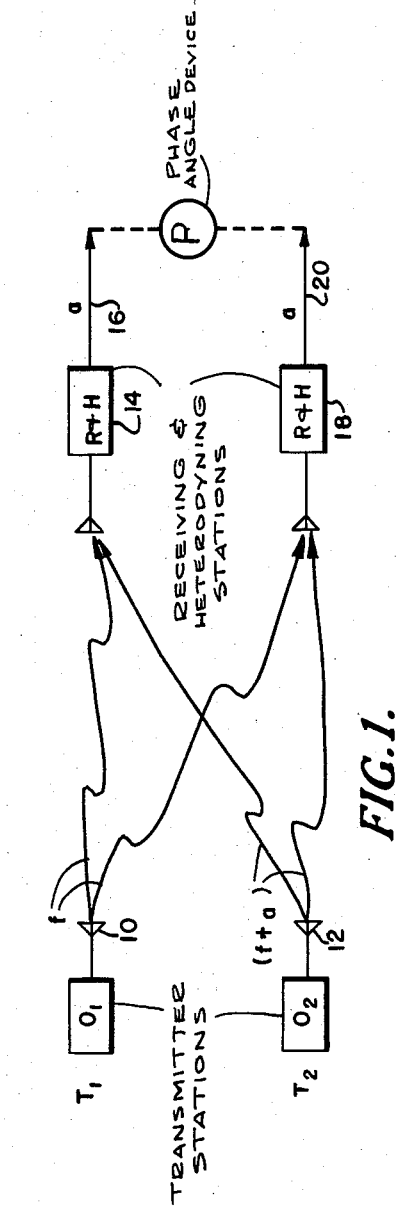
INVENTOR
CHARLES E. HASTINGS
BY Cushman, Darby & Cushman
ATTORNEYS INVENTOR
CHARLES E. HASTINGS
BY Cushman, Darby & Cushman
ATTORNEYS

United States Patent Office

2,971,189
Patented Feb. 7, 1961

2,971,189

RADIO SYSTEM

Charles E. Hastings, Hampton, Va., assignor to Hastings-Raydist, Inc., Hampton, Va., a corporation of Virginia Filed Mar. 22, 1957, Ser. No. 648,485

6 Claims. (Cl. 343—105)

This invention pertains to radio systems for determining position and the like and particularly pertains to heterodyne phase comparison systems.

Heterodyne phase comparison systems have now gained wide prominence in the art of radio navigation, position finding, tracking, and the like. A basic heterodyne phase comparison unit comprises four main components. These components are the two main or positional oscillatory or transmitting components and two main or positional receiving and heterodyning components. The first described heterodyne phase comparison units contemplated generation of a given frequency, usually a radio frequency, at one main transmitting facility and at the other transmitting facility a frequency differing from the first mentioned frequency by a predetermined amount. For convenience, the first mentioned frequency could be designated as $f$ cycles per second, and the other $(f+a)$ cycles per second. Preferably, the amount $a$ is small compared to $f$. That is, where $f$ may be a radio frequency of say 1,000.0 kilocycles per second (kc.p.s. or kc.), $a$ could be 800 cycles per second (c.p.s.). The two frequencies $f$ and $(f+a)$ are received and heterodyned at each of the receiving and heterodyning facilities. The heterodyne frequency $a$ is then conveyed or relayed by any suitable means to a phase angle measuring or indicating device. Various arrangements have been described for conveying or relaying the heterodyne notes to the phase angle indicating device and there is no limitation herein to the location of the phase angle indicating device, or any particular means for conveying same. It should be further understood that wherever a solid conductor could be used between two facilities for conveying a frequency $f$ or $(f+a)$, or relaying frequency $a$, such could be used in place of a radiation link.

The present invention concerns a general modification and improvement upon the known basic units as above described. While the present invention pertains to any array of the four main components as mentioned above, it is of particular usefulness in those cases where a transmitting component and a receiving component must be placed in close proximity to one another. The most direct examples are so-called range or circular systems, and elliptical systems. See prior patent of Hastings 2,528,141 and Heywood et al. 2,709,253, both assigned to the assignee of the present invention. In these cases, wherein a receiving and heterodyning facility must be proximate to a transmitting facility, say both on the same boat or aircraft, there had been difficulty with swamping of the receiving circuits from the nearby source of oscillations.

The aforesaid Heywood et al. patent approaches the problem from the standpoint of what may be conveniently termed heterodyne frequency conversion. That is, in that patent an arrangement is provided including the conversion, usually multiplication, of the heterodyne frequency $a$. However, some disadvantages accrue to such systems, mainly incident to the possibility of jamming the system.

My copending application Serial No. 439,036, filed June 24, 1954, now abandoned, describes a unit embodying the invention of certain of the claims of the present application, and the present application is a continuation-in-part of Serial No. 439,036.

It should be understood that the amount $a$ in the frequency $(f+a)$ need not be in the so-called audio range, around say 1,000 c.p.s.: it could be a much greater frequency. However, experience has shown that it is much easier to measure phase angle between low frequencies around 1,000 c.p.s., than between higher frequencies such as radio frequencies from 1,000 kc. upwards. Additionally, if the amount $a$ in $(f+a)$ is in the audio range, then $f$ and $(f+a)$ can be in the same frequency allocated by the governmental authorities involved. Still further, low heterodyne frequencies with attendantly long wavelengths render completely negligible the effects of phase shifts of these frequencies in relaying same.

The present invention is best distinguished from the system of the aforesaid Heywood et al. patent in that frequency conversion, be it multiplication or division, is exercised upon the radio or higher frequencies involved, rather than upon the lower or heterodyne frequencies.

It is, therefore, a primary object of the invention to provide an improved basic heterodyne phase comparison unit in accordance with the foregoing.

Other objects and the entire scope of the invention will become more fully apparent from the hereinafter detailed description of exemplary embodiments.

A general understanding of the prior art and exemplary embodiments of the present invention may be best understood with reference to the accompanying drawings, wherein:

Figure 1 shows diagrammatically the basic components of a heterodyne phase comparison unit as previously known.

Figure 2 shows a basic heterodyne phase comparison unit according to the present invention.

Figure 3:
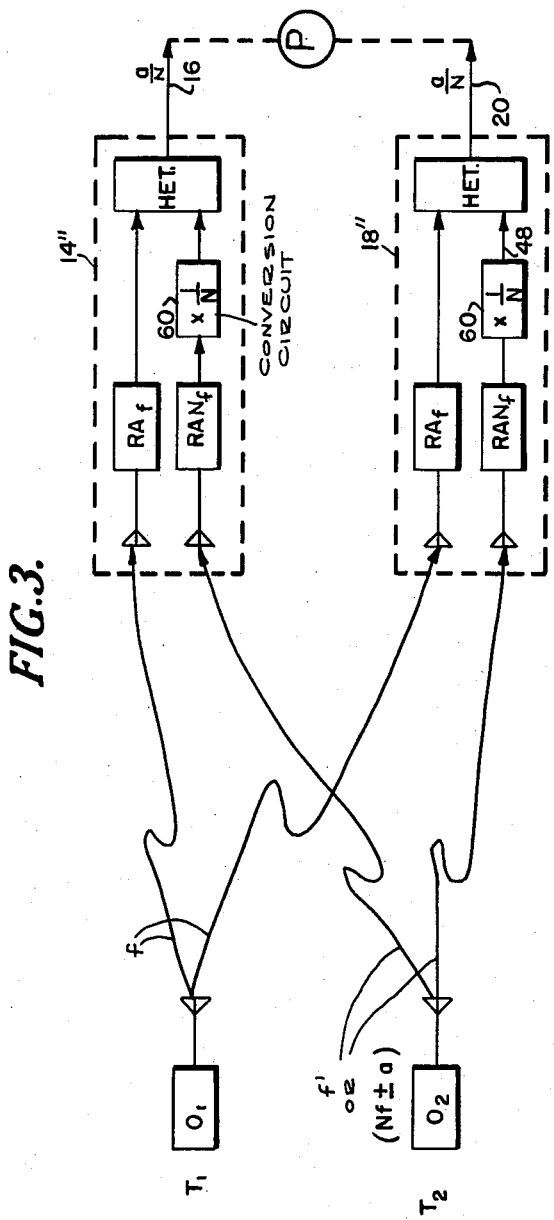
Figure 3 shows a further embodiment of the present invention.

The general organization of a known heterodyne phase comparison unit is illustrated in Figure 1. $O_1$ is a source of oscillations at frequency $f$, say 1,000.0 kc. Signals from $O_1$ may feed antenna 10 for radiation of energy at this frequency. Thusly constituted, the oscillator and antenna may be characterized as a transmitting station $T_1$. However, it should be borne in mind that for the use of any part of the energy from $O_1$ at another station which may be joined to $O_1$ by a solid line conductor, radiation is not required. For convenience, radiation will be illustrated.

The second component is oscillator $O_2$ at frequency $(f+a)$, 1,000.8 kc. for example. Assuming radiation from antenna 12, this combination of $O_2$ and 12 may be defined as transmitting station $T_2$. Again, there may be conduction rather than radiation when convenient.

Reference character 14 designates circuitry for receiving both frequencies $f$ and $(f+a)$ for producing the heterodyne difference frequency $a$ on output line 16 therefrom.

Reference character 18 designates a similar receiving and heterodyning unit for acting between frequencies $f$ and $(f+a)$ to also produce heterodyne frequency $a$ on output line 20 therefrom.

Reference character P represents a phase angle measuring instrument (hereinafter "phasemeter") to which the heterodyne frequencies $a$ on lines 16 and 20, respectively, are supplied as the two necessary inputs. The dashed portions of line 16 and 20 leading to P serve to suggest that the frequencies $a$ can be conveyed to P by any suitable means—relay radiation links, solid conductor links, etc.

It should further be pointed out that usefulness of a heterodyne phase comparison unit as described in the foregoing paragraphs is predicated upon certain fixed and movable relationships among the four main components as above described, to wit, $T_1$, $T_2$, circuit 14 and circuit 18.

If $T_1$ and $T_2$ are spaced apart points fixed as on the ground, and circuit 14 is also at a fixed position as on the ground, and if circuit 18 is on a movable craft such as a boat or aircraft, the system becomes a so-called fixed transmitter hyperbolic unit. In this arrangement, the phase angle indication at P will remain constant if the craft is navigated along a hyperbolic line of position with $T_1$ and $T_2$ as foci. It can be therefore termed a hyperbolic unit.

If circuits 14 and 18 are spaced apart and fixed as on the ground, and one of the transmitting stations, say $T_1$, also fixed on the ground, and station $T_2$ in a mobile craft, the system becomes a so-called moving transmitter system. Again, the phasemeter indication will remain constant if the mobile craft is navigated along a hyperbolic line with circuits 14 and 18 as foci.

If $T_1$ and circuit 14 are positioned in proximity to one another and fixed to the same object, perhaps sharing the same antenna, and $T_2$ and circuit 18 are similarly grouped and fixed together upon a separate object, but the two mentioned objects are movable with respect to one another, the system becomes a so-called range or circular system. In this case, the phasemeter reading will remain constant if the one object having $T_1$ and 14 thereon is navigated along a circular path having a center at the other station combining $T_2$ and 18.

If $T_1$ and 14 are combined together as upon a boat or aircraft, but on the ground $T_2$ and 18 are separated, the system becomes an elliptical one. In this case the phasemeter indication will remain constant if the mobile craft is navigated along an elliptical path having foci at $T_2$ and 18.

Now turning to the present invention, an exemplary unit is illustrated in Figure 2. $T_1$, comprising $O_1$ and antenna 10, remain as in Figure 1. However, $T_2$, comprising oscillator $O_2$ and antenna 12 now operates at a frequency which differs substantially from $f$, and can be generally stated as frequency $f'$. This frequency can be otherwise stated as $(Nf-a)$, still substantially different from $f$. In general, it is $(Nf \pm a)$.

For example, the $(Nf+a)$ case can be selected and N can be 2 and $a$ 800 c.p.s. Therefore, $T_2$ will transmit 2,000.8 kc. where $T_1$ transmits 1,000.0 kc. It should be understood that these figures are only exemplary. The amount $a$ can be anything convenient, although figures around 1,000 c.p.s. are preferable due to the advantages of remaining within bandwidth allocations, rendering negligible errors due to relaying, and comparing phase angle between low frequencies rather than radio frequencies. In general N can be any real, rational, positive number. Usually N will be selected as 2 or 4. However, N could be 2/3. Frequencies can be converted thusly by multiplication and division in sequence.

Circuit 14 in Figure 1 now becomes circuit 14' in Figure 2 and similarly, circuit 18 of Figure 1 becomes circuit 18' of Figure 2. Station 14' is characterized by means designated generally as 30 arranged to receive and carry radio frequency signals around frequency $f$ and isolated from radio frequency signals around $Nf$. For example, means 30 may include antenna 32 and a radio frequency amplification circuit 34. Station 14' further includes a second means designated generally as 36 arranged to receive and carry radio frequency signals around $Nf$—including $(Nf \pm a)$—and isolated from radio frequency signals around $f$. Means 36 may include antenna 38 and radio frequency amplification circuit 40.

The station 14' also has a heterodyne circuit 42 and in addition a first coupling means for applying the output of means 30 as one input to the heterodyne means, and a second coupling means for applying the output of means 36 as a second input to the heterodyne means. The first coupling means may be said to comprise lines 44 and 46. The second coupling means may be said to comprise the line 48 in the illustrated example. Station 14' is further characterized by having at least one of the coupling means include frequency conversion means 50 such as multiplication means to bring the two frequencies at the two inputs to heterodyne means 42 to a like value except for the difference $a$. The result of the operation is the production of the heterodyne note $a$ on the output line 16 of the station 14'. In the given numerical example, the frequency on line 16 will be 800 c.p.s. This is suitably relayed to phasemeter P.

Continuing to refer to Figure 2, station 18' may be a replica of station 14' and no further explanation is thought necessary. On output line 20 will appear the difference or heterodyne note $a$, 800 c.p.s. in the selected example. This is also relayed as necessary and applied to the phasemeter P.

In the unit shown in Figure 2, a 360° rotation of the phasemeter P will provide the positional or like information in terms of the dimension in feet or related units of the wavelength of frequency $Nf$.

Again, it is to be understood that while radiation is shown between $T_1$ and the stations 14' and 18' and between $T_2$ and stations 14' and 18' in Figure 2, any one or more of the radiation links can be replaced by solid conductor links if such is convenient, due regard, of course, being given to the rate of propagation via the medium selected.

Also, it should be understood that while separate antennae 32 and 38 are illustrated, this is done for convenience and to avoid confusion. In practice, wherever two units such as 30 and 40 are to be located in proximity to one another, they may share the same antenna structure.

The frequency conversion means need not all be in one path. Instead, there may be conversion in both paths leading to a heterodyne means. In general, the unit of the present invention rests upon the basis that $O_1$ operates at a given frequency, $O_2$ at a substantially different frequency (more difference than the heterodyne difference) and frequency conversion means are employed to bring the frequencies at the inputs of the heterodyne means to a like value except for the desired heterodyne difference. The amount of frequency conversion only affects the unit to the extent—usually immaterial—to which the phase shifts (delay times) incident to relaying the heterodyne frequencies are important. Also, the lower frequency (longer wavelength) of the frequency $a$ lessens relaying effects.

It should be recognized that a 360° rotation of P has a distance meaning in terms of the radio frequencies at the inputs to the heterodyne means, rather than the actual frequencies of $O_1$ or $O_2$ if these have been converted. Stated otherwise, P acts in response to the radio frequencies in the heterodyne means, and not upon the actual frequencies of $O_1$ or $O_2$.

Figure 3 shows a unit substantially as in Figure 2, but in this case the aforesaid frequency conversion means in one of the said coupling means is here shown as accomplishing $$\frac{1}{N}$$

conversion in the coupling means comprising line 48, rather than acting by factor N in circuit 50 of station 14' of Figure 2. In Figure 3 the station comparable to 14' is designated 14''. In station 18'' corresponding to station 18' of Figure 2, again note the reciprocal frequency conversion circuit 60. The operation of this unit is entirely corresponding to the operation of that of Figure 2, except that the heterodyne note on lines 16 and 20 will be $$\frac{a}{N}$$

Accordingly, a 360° rotation of the phase angle indicating instrument P will represent a distance to be figured on the basis of the wavelength of frequency $f$ rather than $Nf$.

In some situations the effect of the amount $a$ in $$(Nf \pm a), \left(f \pm \frac{a}{N}\right)$$

etc. may be deemed important for extreme accuracy. The extent to which the phasemeter P is responding not purely to a radio frequency such as $Nf$, but to $Nf$ plus or minus a factor of $a$, can be calculated according to phase shifts in the relaying links, taking into consideration the wavelength of $a$ and the propagation rates involved.

Figure 4:
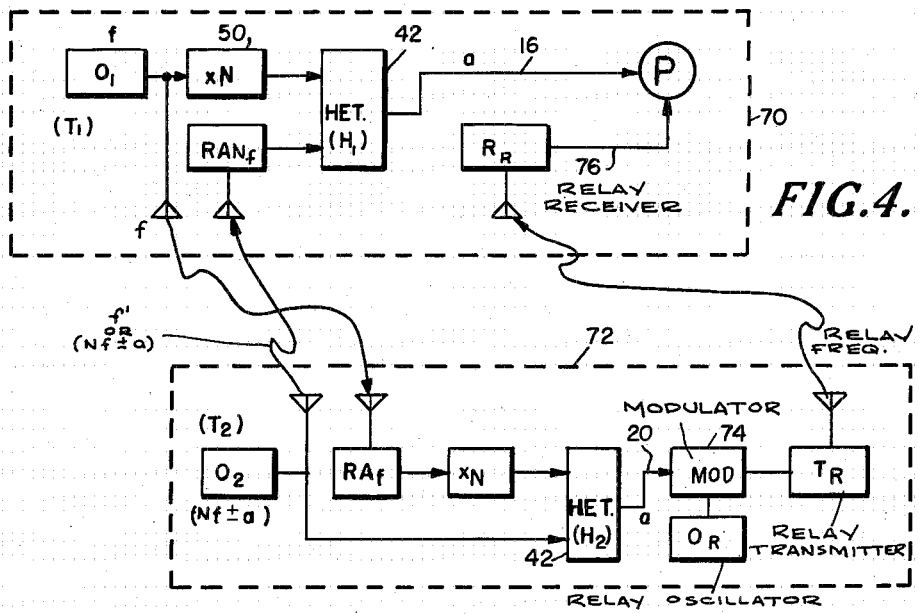
Figure 4 shows an embodiment of the present invention incorporated into a circular system.

Figure 4 shows a unit as in Figure 2, but in this case with a main transmitting means and a main receiving and heterodyning means positioned together as on a boat or aircraft, and designated as station 70. The remaining transmitting unit and receiving and heterodyning unit are positioned together at another station 72. Station 72 may be on the ground or on another mobile craft. In this case, the proximity of $O_1$ to the conversion circuit 50 and heterodyne circuit 42 at station 70 permits a direct coupling between the oscillator $O_1$ and circuit 50. Similarly, there may be a direct coupling between the oscillator $O_2$ and the heterodyne circuit 42 at the station 72. Stated otherwise, the radio amplification circuit 34 of station 14' of Figure 2 is eliminated, as is the radio amplification circuit 40 of station 18' of Figure 2.

In Figure 4 an example is shown of the relaying of one of the heterodyne frequencies $a$ from one station to another. In the given case phasemeter P is at station 70 and the heterodyne note $a$ on the output line 20 of station 72 is modulated at circuit 74 upon a relay carrier frequency generated in oscillator $O_R$, and this modulated carrier transmitted by relay transmitter $T_R$ to relay receiver $R_R$ at station 70 for application of the relayed heterodyne note $a$ as one input to the phase angle indicating instrument P.

It will be understood that in Figure 4 the frequency conversion means may be differently arranged as the difference between Figures 2 and 3 with the same result, except that the reading of the phase angle indicating instrument must be taken in terms of the wavelength of frequency $f$ rather than $(Nf \pm a)$.

Figure 5:
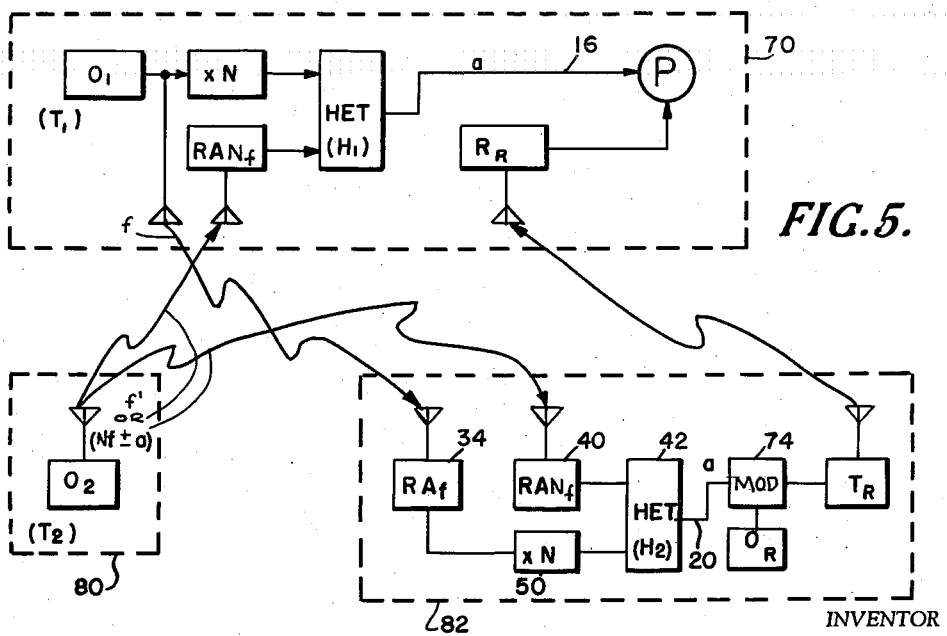
Figure 5 shows an embodiment of the present invention incorporated into an elliptical system.

Figure 5 corresponds to Figure 4 except that the equipment all at station 72 in Figure 4 is now divided between stations 80 and 82, with some components added at 82. The oscillator $O_2$ remains at station 80. Station 82 includes radio amplification circuit 34 for frequency $f$ and radio amplification circuit 40 for frequency $Nf$. Frequency conversion circuit 50 is between circuit 34 and the heterodyne circuit 42. The heterodyne frequency on line 20 is modulated at circuit 74 upon the carrier generated at oscillator $O_R$ and the signal transmitted via $T_R$ to the relay receiver $R_R$ at station 70.

It is again to be emphasized that the relay link comprising components 74, $O_R$, $T_R$ and $R_R$ in Figures 4 and 5, is given only as an example of relaying of a heterodyne note. The phasemeter P in these figures could be located at other stations and any convenient relaying means employed. Inasmuch as the frequency of the amount $a$ is preferably small, its wavelength is very great, and the effect of the time of transmission, or shift in phase angle thereof due to transmission, is negligible. In any event, the effect can be calculated mathematically and accounted for in any given system.

Figure 6:
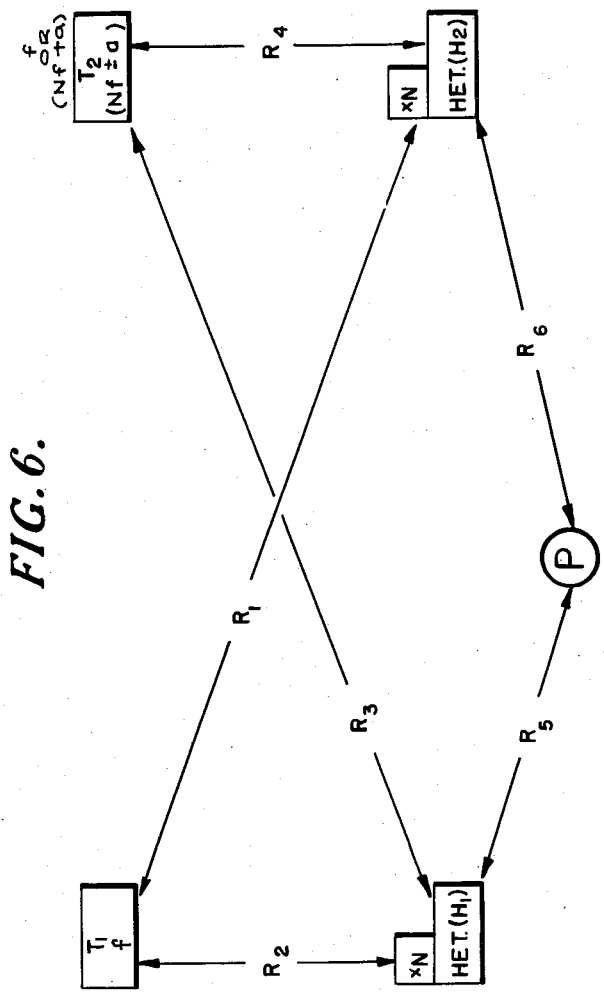
Figure 6 shows the components of a heterodyne phase comparison unit with distances between each component indicated for development of calculations.

For those interested in computations upon the system of the present invention, attention is invited to Figure 6 and the following:

In Figure 6 the primary components of a heterodyne phase comparison unit are shown, with possible distances between each assigned. In a given unit, all of these may be real geographic distances or electrical delays—or some may be zero.

If the rotation of P is represented by X, it can be stated that:

$$X = Nf\left(\frac{R_1}{c_1} + \frac{R_3}{c_3} - \frac{R_2}{c_2} - \frac{R_4}{c_4}\right) + a\left(\frac{R_3}{c_3} - \frac{R_4}{c_4} + \frac{R_5}{c_5} - \frac{R_6}{c_6}\right) \quad (1)$$

wherein:

$R_1$ is the distance from $T_1$ to $H_2$
$R_2$ is the distance from $T_1$ to $H_1$
$R_3$ is the distance from $T_2$ to $H_1$
$R_4$ is the distance from $T_2$ to $H_2$
$R_5$ is the distance from $H_1$ to $P$
$R_6$ is the distance from $H_2$ to $P$
$c_1$ is the propagation rate along $R_1$
$c_2$ is the propagation rate along $R_2$
$c_3$ is the propagation rate along $R_3$
$c_4$ is the propagation rate along $R_4$
$c_5$ is the propagation rate along $R_5$
$c_6$ is the propagation rate along $R_6$.

As above mentioned, what is involved along each leg $R_1$, $R_2$, etc. is a delay or phase shift of the signal involved. Therefore, even if a dimensional distance is not involved, circuitry may cause delays, and such should be considered. Inasmuch as continuous frequencies are involved, all such delays will be constants.

In view of the great number of layouts for the components of Figure 6 no attempt will be made here to apply the above Expression 1 to each. Two examples should suffice, as follows:

Consider a circular system (Fig. 4). Relate Figures 4 and 6 by assuming $T_1$ and $H_1$ to be in station 70, and $T_2$, $H_2$ and P in station 72. (Note shift of P in relation to Fig. 4.) Assume under these circumstances that $R_2 = R_4 = R_6 = O$, and $R_1 = R_3 = R_5 = D$ where D is the distance between stations 70 and 72. Expression 1 becomes:

$$X = Nf\left(\frac{D}{c_1} + \frac{D}{c_3}\right) + c\left(\frac{D}{c_3} + \frac{D}{c_5}\right) \quad (2)$$

Very little error will arise by assigning an average value $c_i$ for $c_1$, $c_2$, etc. If done, Expression 2 becomes $$X = \frac{Nf}{c_i}(2D) + \frac{a}{c_i}(2D)$$

or $$X = \frac{2D}{c_i}(Nf + a) \quad (3)$$

Had P been at station 70 as shown in Figure 4, $R_5$ becomes O and $R_6$ becomes D. Expression 3 becomes:

$$X = \frac{2D}{c_i}(Nf + O) = \frac{2DNF}{c_i} \quad (4)$$

Note that in Expression 4 phasemeter rotations X are in terms of frequency $Nf$, while in Expression 3 are in terms of $(Nf + a)$. In any given layout the frequency or wavelength basis of X can be determined so that X can be converted to distance.

The computation using the $(Nf - a)$ case is entirely similar.

Expressions for hyperbolic and elliptical layouts can be readily developed by assigning $R_1$, $R_2$, etc. suitable values.

It will now be understood, in view of the foregoing explanations, that an improved heterodyne phase comparison unit is provided, particularly valuable where a transmitting means must be located in proximity to a receiving means. However, the principles of the invention apply to all organizations of the basic unit components.

Upon reading the present application various equivalent embodiments will occur to those skilled in the art. Accordingly, the scope of the present invention is to be determined from the appended claims.

What is claimed is:

1. A heterodyne phase comparison unit comprising, at least two non-synchronized means for producing oscillations, at least two receiving and heterodyning means, one oscillation means being tuned to generate a signal at frequency $f$, the other oscillation means being tuned to generate a signal at frequency $f'$ which differs substantially from $f$, each receiving and heterodyning means including: first means arranged to receive and carry radio frequency signals around frequency $f$ from said one oscillation means and isolated from signals around $f'$, second means arranged to receive and carry signals around $f'$ from said second oscillation means and isolated from signals around $f$, first and second coupling means for applying the outputs of said first and second frequency means to the associated heterodyning means, at least one of the coupling means including frequency conversion means to bring the two frequencies to like value except for a frequency difference $a$, the unit further including means for indicating phase angle between electrical signals, and means for conveying the output signals of frequency $a$ generated in the respective heterodyne means to the phase angle means as two inputs thereto.

2. A unit as in claim 1 wherein frequency $f'$ is greater than frequency $f$ and the frequency conversion means of each receiving and heterodyning means consists of a multiplication means in the first coupling means.

3. A unit as in claim 1 wherein frequency $f'$ is greater than frequency $f$ and the frequency conversion means of each receiving and heterodyning means consists of a division means in the second coupling means.

4. A heterodyne phase comparsion unit comprising, at least two non-synchronized means for producing oscillations, at least two receiving and heterodyning means, one oscillation means being tuned to generate a signal at frequency $f$, the other oscillation means being tuned to generate a signal at frequency $(Nf \pm a)$ which differs substantially from $f$, wherein $N$ is any real, rational, positive number, each receiving and heterodyning means including: first means arranged to receive and carry signals around frequency $f$ from said one oscillation means and isolated from signals around $(Nf \pm a)$, second means arranged to receive and carry signals around $(Nf \pm a)$ from said second oscillation means and isolated from signals around $f$, first and second coupling means for applying the outputs of the said first and second frequency means to the associated heterodyning means, at least one of the coupling means including frequency conversion means to bring the two frequencies to like value except for a frequency difference $a$, the unit further including means for indicating phase angle between electrical signals, and means for conveying the output signals of frequency $a$ generated in the respective heterodyne means to the phase angle means as two inputs thereto.

5. A unit as in claim 4 wherein in each receiving and heterodyning means the frequency conversion means converts by a factor of $N$ in the first coupling means.

6. A unit as in claim 4 wherein in each receiving and heterodyning means the frequency conversion means converts by a factor of $$\frac{1}{N}$$

in the second coupling means.

References Cited in the file of this patent

UNITED STATES PATENTS

| 2,148,267 | Honore | Feb. 21, 1939 |
| --- | --- | --- |
| 2,198,113 | Holmes | Apr. 23, 1940 |
| 2,430,244 | O'Brien | Nov. 4, 1947 |
| 2,611,127 | Palmer | Sept. 16, 1952 |
| 2,651,032 | Torcheux et al. | Sept. 11, 1953 |

FOREIGN PATENTS

| 546,000 | Germany | Mar. 8, 1932 |
| --- | --- | --- |